Figure 1:
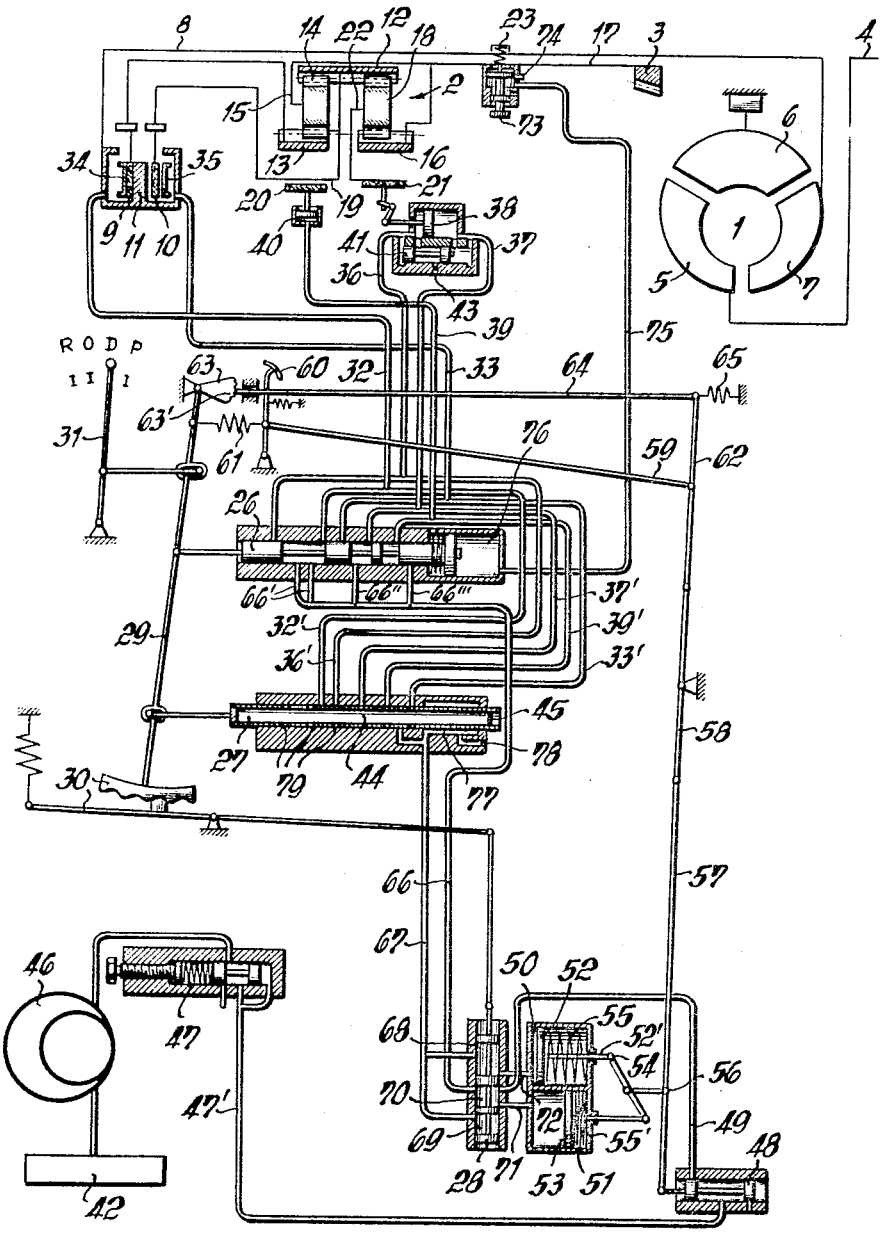

June 13, 1967 E. SZODFRIDT 3,324,745

TRANSMISSION CONTROL SYSTEM

Filed Jan. 15, 1965 3 Sheets-Sheet 3

INVENTOR
Emmerich SZODFRIDT
BY Dicke + Craig
ATTORNEYS 3,324,745
TRANSMISSION CONTROL SYSTEM
Emmerich Szodfridt, Ditzingen, Germany, assignor to
Firma Dr. Ing. h.c.F. Porsche KG, Stuttgart-Zuffen-
hausen, Germany
Filed Jan. 15, 1965, Ser. No. 425,748
Claims priority, application Germany, Jan. 30, 1964,
P 33,483
12 Claims. (Cl. 74—752)

The present invention relates to a hydraulic control and shifting system for the control and shifting elements of change-speed transmissions whose individual speeds or transmission ratios are adapted to be shifted or engaged by means of a speed selector slide member without interruption of torque transmission, especially for hydrodynamic combination transmissions of vehicles.

With the known control and shifting installations of this type as are necessitated for friction clutches and shifting brakes of planetary gears, the change in speed or transmission ratio is initiated and realized by a plurality of shifting valves which are exposed to varying control pressures. The control pressures are built up in dependence on control members on the transmission input and transmission output side and effect the gradual engagement of the shifting members of the change-speed transmission. Furthermore, it is known to carry out the shifting operation by differential pump valves which are exposed to the differential pressure and to the supply quantity of several pumps arranged in the transmission. Notwithstanding the most careful matching of the individual control members it is possible with control installations operating with differential pressures to assure even only an approximately satisfactory shifting operation without shocks during change in speed only with the aid of further measures, as for example, with the installation of delay devices and the like. The means to be used therefor are disproportionately large and considerably increase the cost of the transmission. Additionally, the preselected shifting operation is jeopardized already with slight pressure fluctuations of the complicated prior art control systems.

The aim of the present invention, in contradistinction thereto, essentially consists in creating by means of an easily controllable shifting installation which operates with constant pressure, a progressive shifting operation which excels by a shock-free transmission change or speed change. This is achieved in accordance with the present invention in that between the pressure medium transmitter and the speed selector valve of the shifting installation two alternately actuatable control members are arranged of which the control member actuated or loaded at a given time is in hydraulic communication with the shifting members of the speed or transmission ratio to be engaged and the control member to be relieved with the shifting members of the previously engaged transmission ratio or speed. A simple, operationally reliable shifting installation is obtained thereby which enables a smooth and soft transition from one to the other transmission ratio or speed. The arrangement is preferably so chosen that the control members are coupled with one another in opposition to the effect of elastic means in such a manner that the pressure medium supply to the respectively actuated or loaded member takes place in dependence on the discharge or relief of the member to be relieved during change in speed or transmission ratio. With such an arrangement one is able to get along with few hydraulic control elements so that a large number of possible sources of failures are avoided in the transmission. Simultaneously therewith the desired shifting operation can be adjusted and regulated in the simplest manner by the choice and selection of correspondingly dimensioned springs.

The control members are constituted advantageously by two pistons of identical dimensions and arranged axially parallel to one another, which are operatively connected with each other by a scale-beam structure. As a result thereof, a compact structural unit is created whereby by a corresponding dimensioning of the arms of the scale-beam structure in conjunction with the elastic or springy means, the shifting operation or course can be so designed that it assures a smooth and continuous change in transmission ratio or speed. For that purpose the scale-beam structure preferably rests against a flow-control slide valve member controlling the supply of pressure medium to the piston. A favorable influence of the desired change-speed overlap is achieved in that the scale-beam structure engages at the flow-control slide valve by means of an intermediate linkage influenced in dependence on the vehicle velocity. Furthermore, a shifting slide valve member is coordinated to or operatively associated with the control piston which is in communication hydraulically with the speed selector slide valve as well as with a discharge or relief slide valve and mechanically connected with the shifting linkage of the change-speed transmission. The discharge or relief slide valve member is thereby advantageously included in branched connections into the pressure line system of the speed selector slide valve and is operatively connected with the shifting linkage between the speed selector valve and the shifting slide valve.

Accordingly, it is an object of the present invention to provide a hydraulically operated control system for change-speed transmissions of vehicles, especially motor vehicles, which obviates, by simple and operationally reliable means, the aforementioned shortcomings and drawbacks encountered with the prior art constructions.

It is another object of the present invention to provide a control system for automatically operated change-speed transmissions which is not only simple in construction and reliable in operation but which also assures a completely shock-free change in the transmission ratios.

A further object of the present invention resides in the provision of an automatic control system for change-speed transmissions which assures a smooth and shock-free change in transmission ratios while operating with constant pressure.

Still another object of the present invention resides in the provision of an automatic control system for change-speed transmissions of vehicles which is compact in construction, simple in layout, and substantially foolproof against faulty operations due to pressure fluctuations.

A further object of the present invention resides in the provision of a control system for change-speed transmissions which utilizes a relatively small number of elements yet assures a smooth change in transmission ratios without additional measures, necessitated heretofore in the prior art constructions, that rendered the transmission not only more costly but also increased the size of the control installation.

Still another object of the present invention resides in the provision of a change-speed transmission provided with an automatic control system which excels by a shock-free engagement of the various speeds, and whose proper operation is not jeopardized by slight fluctuations in the pressure.

Still a further object of the present invention resides in the provision of a hydraulic control system for change-speed transmissions which makes possible, in an extremely simple manner, the adjustment and regulation for the desired change-speed operation while at the same time avoiding numerous sources of defects encountered with the prior art constructions.

Another object of the present invention resides in the provision of a hydraulic control system for automatically controlling, in accordance with a preselection, the shifting operations of the change-speed transmissions in such a manner as to assure under all operating conditions a completely smooth and continuous change in speed.

A still further object of the present invention resides in the provision of a hydraulic control system for vehicle change-speed transmissions that makes possible, by simple adjustments, to obtain desired overlaps in the shifting operations for the various speeds.

Figure 2:
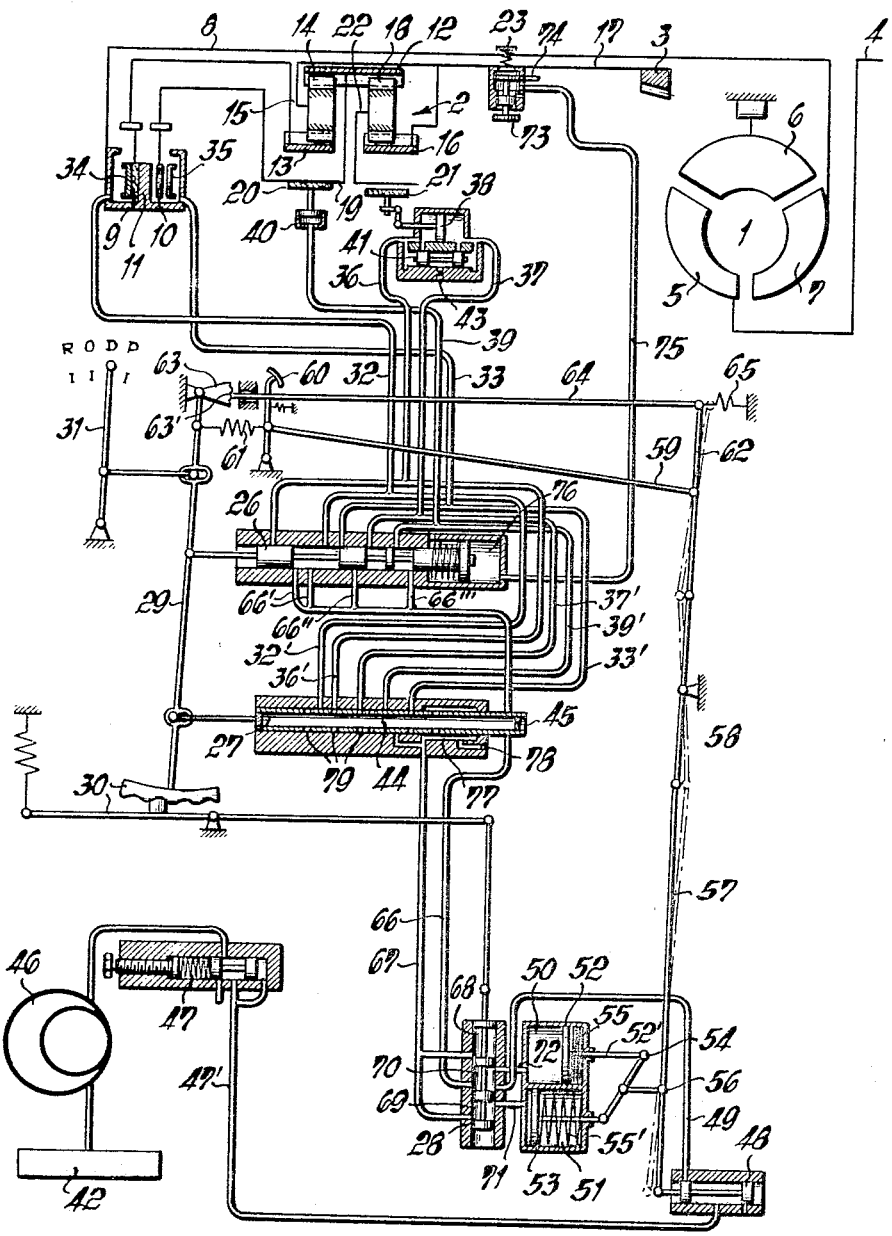
Figure 3:
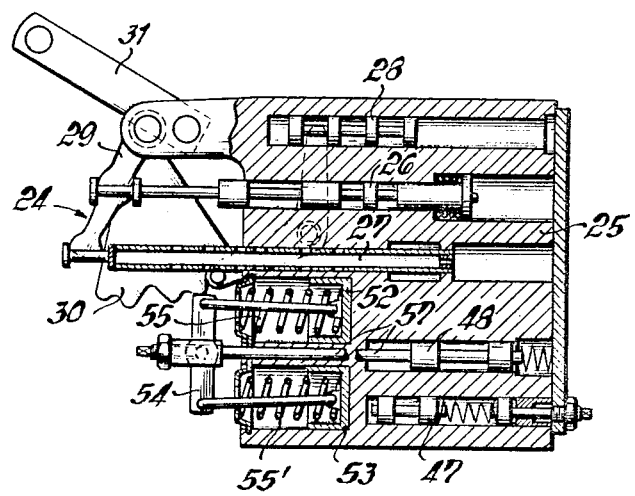

These and further objects features and advantages of the present invention will become more obvious from the following description when taken in connection with the accompanying drawing which shows, for purposes of illustration only, one embodiment in accordance with the present invention, and wherein:

FIGURE 1 is a schematic diagram of a hydrodynamic combination change-speed transmission for motor vehicles provided with the hydraulic shifting installation in accordance with the present invention illustrated in simplified representation at the moment of the shifting operation between two speeds or transmission ratios, FIGURE 2 is a simplified schematic diagram of the hydraulic shifting installation according to FIGURE 1 at the moment of the completed change in speed or transmission ratio between the two aforementioned transmission ratios or speeds, and FIGURE 3 is a longitudinal cross-sectional view through the block or housing containing the slide valve members of the control installation in accordance with the present invention within which are combined the various control members thereof.

Referring now to the drawing wherein like preference numerals are used throughout the various views to designate like parts, the combination transmission of which only a symmetrical half is schematically illustrated, consists of a torque converter generally designated by reference numeral 1 and of a planetary gear transmission generally designated by reference numeral 2 connected behind the torque converter 1 from which are driven the rear wheels of the vehicle by way of a differential gear 3 now shown in detail. The torque converter 1 comprises a pump wheel 5 in driving connection with the crank shaft 4 of the internal combustion engine, a guide wheel 6 supported in a conventional manner against a one-way free-wheeling means as well as a turbine wheel 7 which is operatively connected with the drive shaft 8 of the planetary change-speed gear 2. A drum-shaped member 11 containing friction clutches 9 and 10 is operatively connected with the drive shaft 8. The friction clutches 9 and 10 serve for the realization of three forward speeds and one reverse speed of the planetary change-speed gear 2. The gear or transmission 2 contains for that purpose two planetary gear sets of identical dimensions having a common sun gear 12. The ring gear 13 of the first planetary gear set is adapted to be connected with the friction clutch 9 and meshes with the planet gears 14, whose planet carrier 15 as well as the ring gear 16 of the second planetary gear set are in driving connection with the transmission output shaft 17. The planet gears 18 of the second planetary gear set are in meshing engagement with the sun gear 12 which is adapted to be coupled by way of a brake drum 19 with the friction clutch 10. The drum-shaped part 19 is surrounded by a unilaterally acting band brake 20 for purposes of holding fast the sun gear 12. A further double-acting band brake 21 is coordinated to or operatively associated with the planet carrier 22 of the planet gears 18 of the second planetary gear set. A centrifugal governor 23 of conventional construction is arranged on the transmission output shaft 17 which is coordinated to or operatively connected with a hydraulic transmission shifting mechanism generally designated by reference numeral 24 (FIGURE 3).

The hydraulic transmission shifting mechanism 24 whose individual elements are combined in a control block or housing 25, comprises a speed selector slide valve 26, a discharge or relief slide valve 27 as well as a shifting slide valve 28 which are operatively connected with each other by way of a common control linkage 29 and 30 (FIGURES 1 and 2). A preselector lever 31 is pivotally connected with the linkage 29. The speed selector slide valve 26 is in hydraulic communication by way of lines 32 and 33 with the actuating pistons 34 and 35 of the friction clutches 9 and 10, respectively, as well as by way of lines 36 and 37 with the double-acting piston 38 for the actuation of the band brake 21. A further line 39 leads from the speed selector slide valve 26 to the actuating piston 40 of the band brake 20. A discharge or relief valve 41 having a throttle 43 terminating in the sump or supply tank 42 is coordinated to or operatively connected with the piston 38. Return lines 32′, 33′, 36′, 37′ and 39′ terminate in or branch off from lines 32, 33, 36, 37, and 39, which return lines are in communication in dependence of the engaged speed through the hollow space 44 of the discharge slide valve 27 by way of a discharge or relief throttle valve 45, possibly with the supply tank 42.

The pressure medium of the hydraulic control installation is supplied by a pump 46 driven by an internal combusion engine (not shown) which pump is connected on the suction side with the supply tank or sump 42. A pressure regulating device 47 which is adapted to be adjusted conventionally to a desired pressure, is connected in the output of the pump 46 which opens up the supply to a flow-control slide valve 48 by way of line 47′. The flow-control slide valve 48 is in communication with the shifting slide valve 28 by way of line 49. The shifting slide valve 28 controls the supply of pressure medium between two working cylinders 50 and 51 whose pistons 52 and 53 are connected with each other by a scale-beam or yoke 54 and who are under the influence of compression spring 55 and 55′ of identical characteristics. The scale-beam 54 is pivotally connected by means of rod or link 56 with an adjustable intermediate linkage 57, 58, and 59 which, in turn, is operatively connected with the gas pedal 60 of the internal combustion engine. The control linkage 29 is pivotally connected with the gas pedal 60 by the interposition of a spring 61. The support point of the linkage 59 is adapted to be changed by means of an elastically or yieldingly held lever 62 in dependence on a control disc 63 influenced by the control linkage 29. The control disc 63 engages by way of control linkage 64 with the lever 62 to which is coordinated or with which is operatively associated a compression spring 65 as abutment. The control train 62–65 is additionally connected by way of the intermediate linkage 57 and 58 with the flow control slide valve 48 so that the double-piston unit 50–53 comes to lie between the latter and the shifting slide valve 28. A branched pressure line 66, 66′, 66″, and 66‴ leads from the shifting slide valve 28 to the speed selector slide valve 26, and a line 67 leads to the discharge slide valve 27. The line 67 also branches out and terminates on both sides of the pressure lines 66 in annular spaces 68 and 69 of the shifting slide valve 28 of which the one space 68 is adapted to be connected with the cylinder 50 and the other space 69 with the cylinder 51. The pressure line 66 is operatively connected by way of a further annular space 70 in the shifting slide valve 28 with the pressure line 49. The annular space 70 is adapted to be connected in dependence on the speed selection with lines 71 and 72 which terminate in the cylinder spaces 50 and 51. A control valve 73 cooperates with the centrifugal governor 23 which control valve 73 is connected by way of line 74 with the pump 46. The control valve 73 is in hydraulic communication by way of a further line 75 with a pressure space 76 coordinated to the speed selector valve 26.

Operation

If during operation of the vehicle, for example, the first speed is engaged, then the shifting mechanism 24 assumes the position shown in FIGURE 1 of the drawing. The pressure medium supplied by pump 46 thereby reaches by way of the pressure regulator 47, adjusted to a constant pressure of about 3 atmospheres absolute excess pressure, the flow-control slide valve 48 and the line 49 leading to the annular space 70 of the shifting slide valve 28. A pressure liquid column is built up from the annular space 70 which continues by way of the lines 66, 66', 66" through the speed selector slide valve 26 into the lines 32 and 37, from where the shifting piston 34 in the friction clutch 9 as well as the piston 38 of the band brake 21 are acted upon by the pressure medium. The friction clutch 9 thereby comes into frictional engagement with the driving drum 11 whereas the piston 38 moves toward the left as viewed in FIGURE 1 of the drawing and tightens the band brake 21 about the carrier 22 of the second planetary gear set. The shifting operation, as illustrated in the drawing, is completed when the piston 53, owing to the pressure medium flowing by way of lines 71 out of the annular space 70 of the shifting slide valve 28, reaches from its initial or starting position (upper end position) the position shown in full lines against the effect of the spring 55. The other piston 52 remains in its starting position whereby its cylinder 50 is relieved by way of the annular space 68, the line 67, and a chamber 77 of the slide valve 27 with the aid of a throttle 78. The shifting elements not partaking in the shifting operation, that is, the friction clutch 10, the left cylinder space of the piston 38 and the piston 40 of the band brake 20 are also relieved by the return lines 33', 36' and 39'. For that purpose the slide valve 27 is provided with a plurality of apertures 79 which open up the passage or flow to the hollow space 44. After the automatic termination of this shifting operation, the drive of the vehicle takes place in first speed whereby the engine output is transmitted via the torque converter 1 to the transmission input shaft 8 and from there by means of the friction clutch 9 to the transmission parts 12, 13, 14, 16, and 18 of the planetary gear 2 with a speed reduction to the transmission output shaft 17. The drive of the rear wheels of the vehicle takes place from the transmission output shaft 17 by way of the conventional differential gear 3.

If during normal drive on a level road, the transmission output shaft 17 has reached a predetermined rotational speed in the aforementioned speed reduction transmission ratio or first speed by a corresponding acceleration of the vehicle, then the centrifugal governor 23 responds which produces by way of the slide valve 73 a corresponding reduction of the pressure level in the space 76 of the speed selector slide valve 26 whereby the speed selector slide valve 26 slides toward the right as viewed in FIGURE 1 of the drawing corresponding to the amount of relief or discharge. Both the discharge slide valve 27 as well as the shifting slide valve 28 connected with the speed selector slide valve 26 by means of linkage 29 and 30 are displaced correspondingly until all of the aforementioned control elements assume the position thereof illustrated in FIGURE 2. As a result of the shifting operation, the annular space 70 of the shifting slide valve 28 is connected with the line 72 while maintaining the pressure in line 66 so that now piston 52 is actuated or acted upon by the pressure medium. The oppositely disposed piston 53 is relieved from the pressure medium supply of the pump 46 and is discharged or relieved by way of the annular space 69 against the effect of the nozzle 78 by the force of the spring 55'. By reason of the coupling or connection of the two pistons 52 and 53 by means of the scale-beam or yoke 54, the relief or discharge of the cyinder space 51 of the piston 53 is determinative for the extent of the mutual adjustment independently of the pressure medium supply to the piston 52. If the pressure medium supply is larger than the extent of the relief or discharge, then by way of the piston rod 52' and the rod 56 of the scale-beam 54, which are constructed so as to be mutually relatively movable, as well as by way of the intermediate linkage 57, the flow control slide valve 46 is displaced toward the right which has as consequence a reduction of the pressure medium supply or the complete closure thereof. This operational play repeats itself for such length of time until the cylinder space 51 is completely discharged or relieved. Thus the band brake 20 needed for the engagement of the second speed is thus gradually tightened in dependence on the discharge velocity adapted to be adjusted at the throttle 78. The friction clutch 9, also needed therefor, which was already necessitated for the first speed, remains engaged whereas the band brake 21 is gradually disengaged. This takes place by the gradual discharge or relief through the return line 37' with the aid of the discharge slide valve 27. For that purpose, the relief or discharge throttles 43, 45, and 78 are matched to each other. If the two pistons 52 and 53 have reached in the manner described the end positions thereof indicated in FIGURE 2, then the second speed is engaged without inerruption in torque transmission. The vehicle drive now takes place with the sun gear 26 held stationary from the torque convertor 1 by way of the transmission drive shaft 8, the friction clutch 9, the ring gear 13, the planet gears 14, the planet carrier 15, and the transmission output shaft 17. The parts 16 and 22 of the planet gear 2 rotate freely.

The automatic engagement of the third speed or transmisson ratio takes place analogously in the same manner whereby the two pistons 52 and 53 assume again, in the end position thereof, the position illustrated in FIGURE 1. The downshifting of the transmission also takes place in a similar manner whereby as a result of the pressure increase in the space 76 of the speed-selector slide valve 26, the latter is displaced in the opposite direction whereupon the parts 27 and 28 are adjusted correspondingly.

The connection between the members 54, 54' of the pistons 52 and 53 and the flow control slide valve 48 may be influenced by the control disc 63 connected with the control linkage 29, as indicated in dash and dot lines in FIGURE 2 of the drawing, during the above-described shifting operation of the individual speed in such a manner that an overlap of the individual transmission ratios or speeds is obtained. For this purpose the control disc 63 is provided with a number of notches or detents 63', corresponding to the number of transmission ratios or speeds, with which is in engagement the control rod 64. By a corresponding dimensioning of the detents 63', the basic adjustment of the flow control slide valve 48 is effected in the sense of a more or less large and premature pressure medium supply to the respective piston to be actuated.

While I have shown and described one embodiment in accordance with the present invention, it is understood that the same is not limited thereto but is susceptible of numerous changes and modifications as known to a person skilled in the art; for example, the present invention is also suited for any hydraulically actuated change-speed transmission. Furthermore, for the purpose of the discharge or relief of the individual shifting and/or control members, there may also be provided externally adjustable throttle valves. Thus, it is obvious that the present invention is not limited to the details shown and described herein and I therefore do not wish to be limited to the same but intend to cover all such changes and modifications as are encompassed by the scope of the appended claims.

I claim:

1. A hydraulic shifting installation for the shifting elements of change-speed transmissions, especially for hydrodynamic combination transmissions of vehicles, comprising,
- pressure supply means for producing a hydraulic pressure medium,
- change-speed gear means having a plurality of engageable means for producing the individual speeds thereof,
- and shifting means selectively connecting the pressure medium supply means with the engagable means and relieving the pressure medium from previously engaged engagable means for engaging the individual speeds of a change-speed gear means while maintaining transmission of torque during a change in speed within said change-speed gear means,
- said shifting means including speed selector valve means, and connecting means operatively connecting said supply means with said speed selector valve means and having two control means structurally interrelated for only alternate actuation, one of said two control means being in hydraulic communication by way of said speed selector valve means with the engagable means for the speed to be engaged and the other of said two control means being in hydraulic communication with the engagable means of the previously engaged speed.

2. A hydraulic shifting installation for the shifting elements of change-speed transmissions, especially for hydrodynamic combination transmissions of vehicles, comprising:
- pressure supply means for producing a hydraulic pressure medium,
- change-speed gear means having a plurality of engageable means for producing the individual speeds thereof,
- and shifting means selectively connecting the pressure medium supply means with the engageable means and relieving the pressure medium from previously engaged engagable means for engaging the individual speeds of a change-speed gear means while maintaining transmission of torque during a change in speed within said change-speed gear means,
- said shifting means including speed selector valve means, and connecting means operatively connecting said supply means with said speed selector valve means and having two control means structurally interrelated for only alternate actuation, one of said two control means being in hydraulic communication by way of said speed selector valve means with the engageable means for the speed to be engaged and the other of said two control means being in hydraulic communication with the engageable means of the previously engaged speed,
- and means for coupling said two control means with each other against the effect of elastic means in such a manner that the pressure medium supply to the respectively acted upon control means takes place during change in speed in dependence on the discharge of the control means to be relieved.

3. A hydraulic shifting installation for the shifting elements of change-speed transmissions, especially for hydrodynamic combination transmissions of vehicles, comprising:
- pressure supply means for producing a hydraulic pressure medium,
- change-speed gear means having a plurality of engagable means for producing the individual speeds thereof,
- and shifting means selectively connecting the pressure medium supply means with the engagable means and relieving the pressure medium from previously engaged engagable means for engaging the individual speeds of a change-speed gear means while maintaining transmission of torque during a change in speed within said change-speed gear means,
- said shifting means including speed selector valve means, and connecting means operatively connecting said supply means with said speed selector valve means and having two control means structurally interrelated for only alternate actuation, one of said two control means being in hydraulic communication by way of said speed selector valve means with the engagable means for the speed to be engaged and the other of said two control means being an hydraulic communication with the engagable means of the previously engaged speed,
- means for coupling said two control means with each other against the effect of elastic means in such a manner that the pressure medium supply to the respectively acted upon control means takes place during change in speed in dependence on the discharge of the control means to be relieved,
- said control means being formed by two pistons of substantially identical effective dimensions and arranged axially parallel to one another, and said coupling means including yoke means.

4. A hydraulic shifting installation for the shifting elements of change-speed transmissions, especially for hydrodynamic combination transmissions of vehicles, comprising:
- pressure supply means for producing a hydraulic pressure medium,
- change-speed gear means having a plurality of engagable means for producing the individual speeds thereof,
- and shifting means selectively connecting the pressure medium supply means with the engageable means and relieving the pressure medium from previously engaged engagable means for engaging the individual speeds of a change-speed gear means while maintaining transmission of torque during a change in speed within said change-speed gear means,
- said shifting means including speed selector valve means, and connecting means operatively connecting said supply means with said speed selector valve means and having two control means structurally interrelated for only alternate actuation, one of said two control means being in hydraulic communication by way of said speed selector valve means with the engageable means for the speed to be engaged and the other of said two control means being in hydraulic communication with the engagable means of the previously engaged speed,
- means for coupling said two control means with each other against the effect of elastic means in such a manner that the pressure medium supply to the respectively acted upon control means takes place during change in speed in dependence on the discharge of the control means to be relieved,
- said control means being formed by two pistons of substantially identical effective dimensions and arranged axially parallel to one another, and said coupling means including yoke means,
- and flow-control valve means in said connecting means for controlling the supply of pressure medium to said piston means, and said yoke means being supported on said flow-control valve means.

5. A hydraulic shifting installation for the shifting elements of change-speed transmissions, especially for hydrodynamic combination transmissions of vehicles, comprising:
- pressure supply means for producing a hydraulic pressure medium,
- change-speed gear means having a plurality of engagable means for producing the individual speeds thereof,
- and shifting means selectively connecting the pressure medium supply means with the engagable means and relieving the pressure medium from previously engaged engagable means for engaging the individual speeds of a change-speed gear means while maintaining transmission of torque during a change in speed within said change-speed gear means, said shifting means including speed selector valve means, and connecting means operatively connecting said supply means with said speed selector valve means and having two control means structurally interrelated for only alternate actuation, one of said two control means being in hydraulic communication by way of said speed selector valve means with the engagable means for the speed to be engaged and the other of said two control means being in hydraulic communication with the engagable means of the previously engaged speed, means for coupling said two control means with each other against the effect of elastic means in such a manner that the pressure medium supply to the respectively acted upon control means takes place during change in speed in dependence on the discharge of the control means to be relieved, said control means being formed by two pistons of substantially identical effective dimensions and arranged axially parallel to one another, and said coupling means including yoke means, and flow-control valve means in said connecting means for controlling the supply of pressure medium to said piston means, and said yoke means being supported on said flow-control means, and further connecting means operatively connecting said yoke means with said flow-control means including intermediate linkage means and means for influencing said intermediate linkage means in dependence on the vehicle velocity.

6. A hydraulic shifting installation for the shifting elements of change-speed transmissions, especially for hydrodynamic combination transmissions of vehicles, comprising:

pressure supply means for producing a hydraulic pressure medium, change-speed gear means having a plurality of engageable means for producing the individual speeds thereof, and shifting means selectively connecting the pressure medium supply means with the engageable means for engaging the individual speeds of a change-speed gear means while maintaining transmission of torque during change in speed within said change speed gear means, said shifting means including shifting linkage means, speed selector valve means, discharge valve means, and connecting means operatively connecting said supply means with said speed selector valve means having two alternately actuatable control means structurally interrelated for only alternate actuation, one of said two control means being in hydraulic communication by way of said speed selector valve means with the engageable means for the speed to be engaged and the other of said two control means being in hydraulic communication with the engagable means of the previously engaged speed, and shifting valve means operatively associated with said two control means and hydraulically connected with said speed selector valve means and said discharge valve means and mechanically operatively connected with the shifting linkage means of the change-speed transmission.

7. A hydraulic shifting installation for the shifting elements of change-speed transmissions, especially for hydrodynamic combination transmissions of vehicles, comprising:

pressure supply means for producing a hydraulic pressure medium, change-speed gear means having a plurality of engagable means for producing the individual speeds thereof, and shifting means selectively connecting the pressure medium supply means with the engageable means for engaging the individual speeds of a change-speed gear means while maintaining transmission of torque during change in speed within said change speed gear means, said shifting means including shifting linkage means, speed selector valve means, discharge valve means, and connecting means operatively connecting said supply means with said speed selector valve means having two control means structurally interrelated for only alternate actuation, one of said two control means being in hydraulic communication by way of said speed selector valve means with the engageable means for the speed to be engaged and the other of said two control means being in hydraulic communication with the engageable means of the previously engaged speed, and shifting valve means operatively associated with said two control means and hydraulically connected with said speed selector valve means and said discharge valve means and mechanically operatively connected with the shifting linkage means of the change-speed transmission, said shifting means including a pressure line system, and said discharge slide valve means being connected by way of a branched connection with said pressure line system and being pivotally connected with said shifting linkage means between said speed selector valve means and said shifting valve means.

8. A hydraulic shifting installation for the shifting elements of change-speed transmissions, especially for hydrodynamic combination transmissions of vehicles comprising:

pressure supply means for producing a hydraulic pressure medium, change-speed gear means having a plurality of engagable means for producing the individual speeds thereof, and shifting means selectively connecting the pressure medium supply means with the engagable means for engaging the individual speeds of a change-speed gear means while maintaining transmission of torque during a change in speed within said change-speed gear means, said shifting means including speed selector valve means, and connecting means operatively connecting said supply means with said speed selector valve means and having two alternately actuatable control means, one of said two control means being in hydraulic communication by way of said speed selector valve means with the engageable means for the speed to be engaged and the other of said two control means being in hydraulic communication with the engagable means of the previously engaged speed, and means for coupling said two control means with each other against the effect of elastic means in such a manner that the pressure medium supply to the respectively acted upon control means takes place during change in speed in dependence on the discharge of the control means to be relieved, said control means being formed by two pistons of substantially identical effective dimensions and arranged axially parallel to one another, and said coupling means including scale-beam means.

9. A hydraulic shifting installation for the shifting elements of change-speed transmissions, especially for hydrodynamic combination transmissions of vehicles, comprising:

pressure supply means for producing a hydraulic pressure medium, change-speed gear means having a plurality of engagable means for producing the individual speeds thereof, and shifting means selectively connecting the pressure medium supply means with the engagable means for engaging the individual speeds of a change-speed gear means while maintaining transmission of torque during a change in speed within said change-speed gear means, said shifting means including speed selector valve means, and connecting means operatively connecting said supply means with said speed selector valve means and having two alternately actuatable control means, one of said two control means being in hydraulic communciation by way of said speed selector valve means with the engagable means for the speed to be engaged and the other of said two control means being in hydraulic communication with the engagable means of the previously engaged speed, and means for coupling said two control means with each other against the effect of elastic means in such a manner that the pressure medium supply to the respectively acted upon control means takes place during change in speed in dependence on the discharge of the control means to be relieved, said control means being formed by two pistons of substantially identical effective dimensions and arranged axially parallel to one another, and said coupling means including scale-beam means, and flow-control valve means in said connecting means for controlling the supply of pressure medium to said piston means, and said scale-beam means being supported on said flow-control valve means.

10. A hydraulic shifting installation for the shifting elements of change-speed transmissions, especially for hydrodynamic combination transmissions of vehicles, comprising:

pressure supply means for producing a hydraulic pressure medium, change-speed gear means having a plurality of engagable means for producing the individual speeds thereof, and shifting means selectively connecting the pressure medium supply means with the engagable means for engaging the individual speeds of a change-speed gear means while maintaining transmission of torque during a change in speed within said change-speed gear means, said shifting means including speed selector valve means, and connecting means operatively connecting said supply means with said speed selector valve means and having two alternately actuatable control means, one of said two control means being in hydraulic communication by way of said speed selector valve means with the engagable means for the speed to be engaged and the other of said two control means being in hydraulic communication with the engagable means of the previously engaged speed, and means for coupling said two control means with each other against the effect of elastic means in such a manner that the pressure medium supply to the respectively acted upon control means takes place during change in speed in dependence on the discharge of the control means to be relieved, said control means being formed by two pistons of substantially identical effective dimensions and arranged axially parallel to one another, and said coupling means including scale-beam means, and flow-control valve means in said connecting means for controlling the supply of pressure medium to said piston means, and said scale-beam means being supported on said flow-control valve means, and further connecting means operatively connecting said scale-beam means with said flow-control valve means including intermediate linkage means operable to be influenced in dependence on the vehicle velocity.

11. A hydraulic shifting installation for the shifting elements of change-speed transmissions, especially for hydrodynamic combination transmissions of vehicles, comprising:

pressure supply means for producing a hydraulic pressure medium, change-speed gear means having a plurality of engagable means for producing the individual speeds thereof, and shifting means selectively connecting the pressure medium supply means with the engageable means for engaging the individual speeds of a change-speed gear means while maintaining transmission of torque during change in speed within said change speed gear means, said shifting means including shifting linkage means, speed selector valve means, discharge valve means, and connecting means operatively connecting said supply means with said speed selector valve means having two alternately actuatable control means, one of said two control means being in hydraulic communication by way of said speed selector valve means with the engagable means for the speed to be engaged and the other of said two control means being in hydraulic communication with the engagable means of the previously engaged speed, means for coupling said two control means with each other against the effect of elastic means in such a manner that the pressure medium supply to the respectively acted upon control means takes place during change in speed in dependence on the discharge of the control means to be relieved, said control means being formed by two pistons of substantially identical effective dimensions and arranged axially parallel to one another, and said coupling means including scale beam means, and shifting valve means operatively associated with said two control means and hydraulically connected with said speed selector valve means and said discharge valve means and mechanically operatively connected with the shifting linkage means of the change-speed transmission.

12. A hydraulic shifting installation for the shifting elements of change-speed transmissions, especially for hydrodynamic combination transmissions of vehicles, comprising:

pressure supply means for producing a hydraulic pressure medium, change-speed gear means having a plurality of engagable means for producing the individual speeds thereof, and shifting means selectively connecting the pressure medium supply means with the engagable means for engaging the individual speeds of a change-speed gear means while maintaining transmission of torque during change in speed within said change speed gear means, said shifting means including shifting linkage means, speed selector valve means, discharge valve means, and connecting means operatively connecting said supply means with said speed selector valve means having two alternately actuatable control means, one of said two control means being in hydraulic communication by way of said speed selector valve means with the engagable means for the speed to be engaged and the other of said two control means being in hydraulic communication with the engagable means of the previously engaged speed, means for coupling said two control means with each other against the effect of elastic means in such a manner that the pressure medium supply to the respectively acted upon control means takes place during change in speed in dependence on the discharge of the control means to be relieved, said control means being formed by two pistons of substantially identical effective dimensions and arranged axially parallel to one another, and said coupling means including scale beam means, flow-control valve means in said connecting means for controlling the supply of pressure medium to said piston means, and said scale-beam means being supported at said flow-control valve means, means operatively connecting said scale-beam means with said flow-control valve means including intermediate linkage means adapted to be influenced in dependence on the vehicle velocity, and shifting valve means operatively associated with said two control means and hydraulically connected with said speed selector valve means and said discharge valve means and mechanically operatively connected with the shifting linkage means of the change-speed transmission, said shifting means including a pressure line system, and said discharge slide valve means being connected by way of a branched connection with said pressure line system and being pivotally connected with said shifting linkage means between said speed selector valve means and said shifting valve means.

References Cited

UNITED STATES PATENTS

| | | | |
|---|---|---|---|
| 2,732,732 | 1/1956 | Borman | 74—732 |
| 2,734,399 | 2/1956 | Christenson | 74—732 |
| 2,766,639 | 10/1956 | Rosenberger | 74—472 |
| 2,769,350 | 11/1956 | Lucia et al. | 74—472 |
| 2,831,365 | 4/1958 | Herndon | 74—472 |
| 3,014,383 | 12/1961 | Flinn | 74—645 |
| 3,258,984 | 7/1966 | Searles | 74—472 |
| 3,274,848 | 9/1966 | Konrad et al. | 74—472 |

ROBERT M. WALKER, *Primary Examiner.*

DAVID J. WILLIAMOWSKY, *Examiner.*

J. R. BENEFIEL, *Assistant Examiner.*